Sept. 22, 1970

J. F. THOMPSON 3,529,730

REPOSITORY FOR CREMATED REMAINS

Filed Aug. 5, 1968

INVENTOR
JENCE F. THOMPSON
BY
Christensen, Sanborn & Matthews
ATTORNEYS

United States Patent Office 3,529,730
Patented Sept. 22, 1970

3,529,730
REPOSITORY FOR CREMATED REMAINS
Jence F. Thompson, Danville, Calif.
(9821 Davies Road, Lake Stevens, Wash. 98258)
Filed Aug. 5, 1968, Ser. No. 750,198
Int. Cl. A47g *29/00*
U.S. Cl. 211—71                                              6 Claims

ABSTRACT OF THE DISCLOSURE

An urn and storage construction for interment of cremated remains including a frame structure supporting a plurality of storage tube members in generally parallel side-by-side and top-to-bottom relationship. Each of the storage tubes slidably receive a plurality of individual urn containers, and the ends of the tubes are provided with closure means.

BACKGROUND OF THE INVENTION

Field of the invention

This invention relates to the interment of cremated remains and particularly to a repository structure for storing the containers of such remains.

Description of the prior art

The death of loved ones is an inevitable fact. The reverence for the memory of the deceased loved one is often expressed by visits to the location of the remains of the deceased. The expense involved in providing a respectable interment of the remains of a deceased includes the cost of the depository where the remains will be stored for an indefinite period, often termed "perpetual." During the years immediately following the death of a loved one, those closest to the deceased make periodic visits to the repository to pay their respects. Because of the generally inefficient utilization of storage volume by present repository configurations, the expense of such interment often adds to the other financial burdens caused by the death itself. In those cases where funds are quite limited, a repository is chosen which may be located far out of the general metropolitan area because of the cheaper land cost and therefore, reduced cost of storage. Such remote repository locations make visitations more inconvenient and in time, less frequent.

Often the funding originally considered more than adequate for establishing perpetual care for a cemetery proves to be inadequate as the cost of labor and other inflationary trends reduce the funds available and reduce the standard of gardening and building maintenance in the cemetery. There are often cases of abandoned cemeteries which have become overrun by wild plant growth. Instead of presenting a suitable, pleasant setting for recollection and respectful resting place for the deceased, such cemeteries present a dismal, disrespectful setting giving testimony to a rather pathetic situation.

As the ravages of hurricanes and earthquakes often destroy and actually empty out the putrid remains of a cemetery, the very health hazards presented by the system of burying a deceased in a corpse form, where natural decay will take its toll, seems contrary to the interest of public health and sanitation. The utilization of cemetery property for rights-of-way for public utilities such as sewers, electrical power or a highway rapid transit route is often impractical due to the difficulty of obtaining consent of the next of kin of those deceased interred in the cemetery permitting removal and relocation of their remains. In addition, when consent to such removal is obtained, the difficulties resulting from physical digging and relocation of a casket lowered into the earth several years before adds to the cost of such changes in utilization of cemetery property.

Several systems have been proposed which in one way or another serve to lessen the problems heretofore related. In the patent to Dorris 3,295,271 a series of contiguous multiple burial cripts are disclosed which permit side-by-side placement of caskets and vertical stacking of caskets for burial of human remains beneath the surface of the earth. The caskets are surrounded by a concrete structure rather than by dirt and as much of the space as possible is utilized for storage of the caskets in an end-to-end side-to-side and top-to-bottom relationship. It might be stated that such a structural system optimizes the beneath the earth type of burial of noncreamated human remains.

Cremation of deceased loved ones has now become common practice and its inherent reduction of volume of the corpse provides a significant reduction in the storage requirements for interment of the remains. As disclosed in the patent to McClellen 2,513,951 in the general situation a single urn containing the contents of an individual deceased person is stored in an interment niche located in a permanent structure having its interior walls lined by stacked side-by-side positioned niches. Such a structure is referred to as a columbarium. As noted, sometimes two or more urns of related persons are placed in a single niche. With the repository of cremated remains, it is possible to sore a great number of urns in an above-the-surface columbarium making visitation and maintenance easier than in the situation of buried corpse cemeteries.

A somewhat more elaborate urn-supporting structure is disclosed in the patent to Diem 3,254,773. A more compact storage array for a burial receptacle for ashes is disclosed in the patent to Bircher 2,009,724 wherein a series of book-volume configured urns are stored side-by-side on a glass enclosed bookshelf.

OBJECTS AND SUMMARY OF INVENTION

From the foregoing recitation concerning burial practices and prior art techniques for providing storage for the remains of deceased loved ones, it is seen that none of the systems provide a truly efficient utilization of available storage space and it is therefore the principal object of the instant invention to provide a generally improved system for storing cremated remains in a most efficient manner to provide their inexpensive storage and convenient visitations to such remains.

Another object of the instant invention is to provide an improved receptacle for cremated remains which can be easily trans-shipped from one repository to another in the event that the next of kin to the deceased finds a more convenient repository.

An additional object of the invention is to provide an improved repository for cremated remains which can be inexpensively located in a small area while providing adequate and appropriate interment for a large number of individual urns containing cremated remains.

A still further object of the instant invention is to provide a repository for cremated remains which structurally supplies security for a great number of years, yet in the event of damage through explosion, earthquake or other disaster, will not add a health hazard by reason of rupture of the repository.

In accordance with the present invention a repository structure is provided which includes a series of generally horizontally disposed tube structures arrayed in a contiguous side-by-side top-and-bottom relationship. Individual receptacles having a configuration substantially identical to the interior cross-section of the tube structure, but slightly smaller, are loaded axially into the tube structures for storage of the receptacles in the tubes. The receptacles are made of sufficiently rigid and permanent structure to hold the inert cremated remains securely permitting transshipment of the remains in the receptacles from one repository to another as desired. An attractive columbarium is disclosed which provides a repository for a substantial number of individual urns in the form of a tube-shaped receptacle in an array which is respectful, yet volumetrically efficient.

These and other features and advantages of the instant invention will become more clearly apparent from the following detailed description thereof, which is to be read with reference to the accompanying drawings.

DESCRIPTION OF THE PREFERRED EMBODIMENTS

Figure 2:
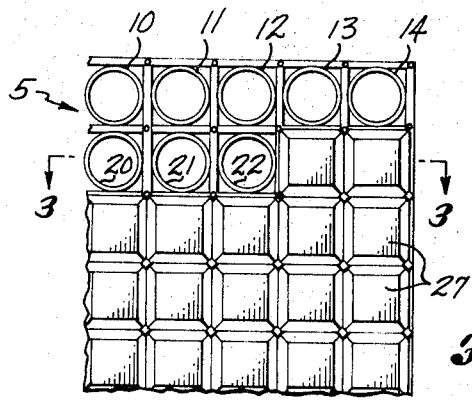
FIG. 2 is a partial end elevation view of the repository shown in FIG. 1.
Figure 3:
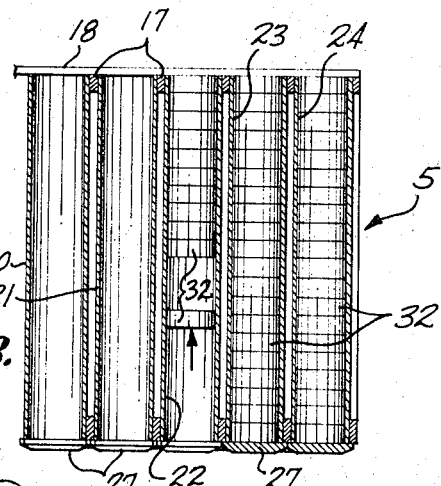
FIG. 3 is a top section view as seen through lines 3—3 of FIG. 2 illustrating the storage array of the individual receptacles in a repository made in accordance with the instant invention.
Figure 1:
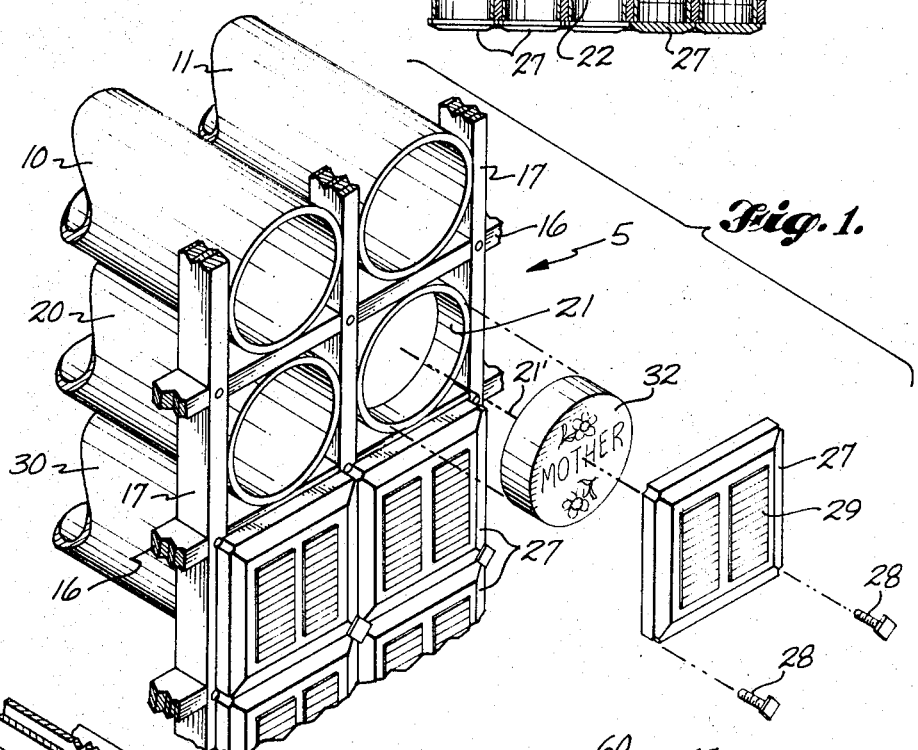
FIG. 1 is a partial exploded isometric view of the first embodiment of the repository and cremated remains receptacle made in accordance with the instant invention.

With particular reference to FIGS. 1–3, the first embodiment repository 5 is disclosed. As shown in FIG. 1, a plurality of circular cross section tubes 10, 11, 20, 21 and 30 are arrayed and supported by horizontal frame members 16 and vertical frame members 17 in a generally parallel close adjacent side-by-side and top-to-bottom relationship.

As shown in FIG. 3, one end of the tubes may be sealed off or closed by rear closure plate 18 extending generally normal to the axis of each of the tubes. The forward end or access end of the tubes, such as tube 21, is sealed off by closure plate 27 which is attached by removable closure bolts 28. Closure plate 27 may provide support for individual name plates 29 which may be engraved or otherwise contain indicia identifying the name of the deceased whose cremated remains are stored within the tube 21. If desired, access to the tubes could be provided at both ends thereof. A remains container or urn 32 is provided for the cremated remains of each of the individual deceased. As shown, container 32 defines an exterior configuration complementary to the inside cross section of tube 21 so that the container can be deposited in and removed from the tubes as desired. As shown in FIG. 3, a large quantity of the individual containers 32 may be stored in each individual storage tube. For example, tubes 23 and 24 each contain twenty individual tube-shaped urns 32.

Figure 4:
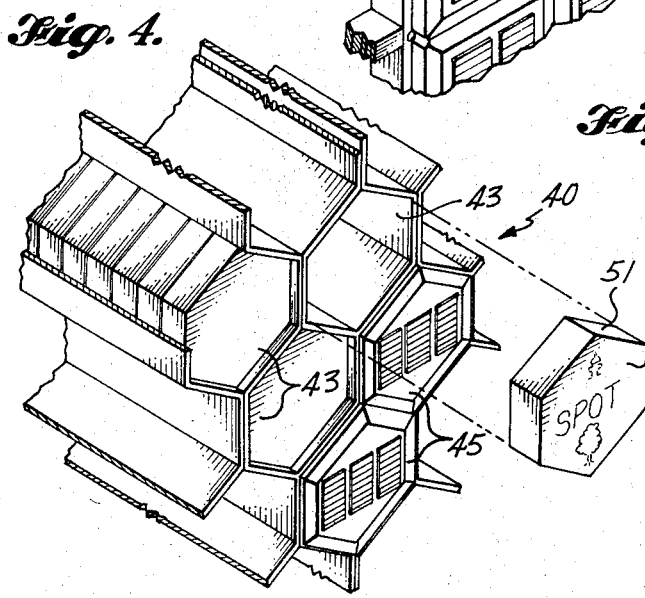
FIG. 4 is a partial exploded isometric view with some parts removed for clarity illustrating a second embodiment of a repository and cremated remains receptacle made in accordance with the instant invention.

With reference to FIG. 4, it is noted that a second embodiment repository 40 is illustrated having a series of parallel disposed tubes 43 presenting a honeycomb cross section arrangement. The access end of the tubes 43 may be sealed by means of closure plates 45. The remains container 50 is shown with an exterior surface 51 defining a six-sided urn having dimensions substantially equal to the inside dimensions of tube 43 permitting effective utilization of the volume of each of the tubes as the remains containers 50 are axially stacked in each of the tubes 43.

Other cross sectional configurations of the individual storage tubes may be provided including for example, a rectangular cross section. The particular materials involved in producing a repository such as herein disclosed are quite varied. For example, tubes of the first embodiment 50 can be simply made of iron pipe at a minimum expense or a more attractive appearance could be presented by the use of stainless steel tubing. The structural requirements are well within the economic use of many different materials since the weight of the cremated remains and the containers is quite small and the span length of the tubes is not too great. For example, it has been found that approximately 240 cubic inches of space is adequate to contain the cremated remains of even the largest humans. Utilizing a ten inch inside diameter container having an outside width of three inches, it is possible to store twenty such containers axially within one tube with a tube length of five feet. Of course, longer tubes could be made. The twenty container tube is only described for purposes of example.

Figure 5:
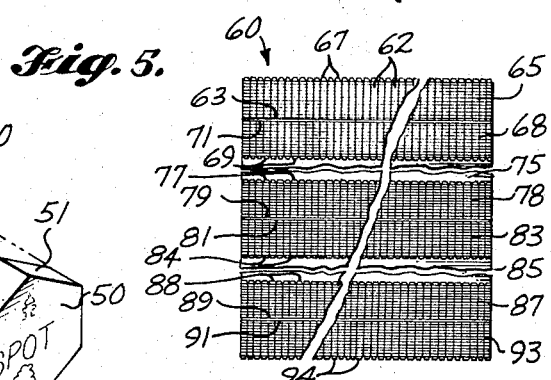
FIG. 5 is a schematic top plan view of an improved repository made in accordance with the instant invention.

To emphasize the volumetric efficiency of the repositories of the instant invention FIG. 5 illustrates an improved repository building 60. A bank of repository tubes 62 is shown forming a wall 65 having a width of fifty feet, a height of five feet and a depth for the length of the tubes of five feet for providing adequate storage for the cremated remains of five thousand people. Building 60 includes a first such bank 65 with its access openings 67 exposed to the outside and forming an outside wall. A second bank 68 has its access 69 exposed to a first hallway 75, its back 71 being adjacent the back 63 of the first bank 65. The first interior hallway 75 may be ten feet in width and extends the full fifty feet length of building 60 providing access to one end 77 of a third bank 78. The back 79 of third bank 78 is positioned adjacent the back 81 of a fourth bank 83 having its access 84 open to a second interior hallway 85 also of ten feet width. A fifth bank 87 has its access end 88 open to second hallway 85 with its back end 89 adjacent the back end 91 of sixth bank 93. The access end 94 of sixth bank 93 is exposed to the outside of building 60. Such a building 60 may have an overall dimension of 50' x 50', or 2500 square feet providing a storage capacity, with tubes 62 on one foot centers five high and five feet in length, of 30,000 individual remains containers. The tubes can be stacked higher and a relocation system could be used whereby the remains of those dead the longest would be located in the lower and higher rolls of tubes with the most recent deceased being stored at easy-to-find intermediate levels.

With such an efficient utilization of land area, it is possible that a building such as just described with reference to FIG. 5 could be located on the premises of an established municipal cemetery to generate enough storage income to provide the necessary financing to maintain the entire cemetery in a first class condition. In addition, it would be possible to use banks of tubes on inside walls of church buildings or memorial halls, thereby adding to the convenience of visitation without significantly reducing the space available for other uses. In a large metropolitan area, memorial repositories could be installed in a subterranean area permitting the ground area above it to be used for a park and yet being located in an easily accessible part of town permitting easy visitation in a delightful setting for such repositories.

If the next of kin of one of the loved ones whose remains are stored in such a depository moves from one part of town to another or from one town to another, it would be a simple matter of requesting the remains container to be removed from one repository and transshiped to a more convenient repository. In the days of such a mobile society such a facility of movement of the cremated remains would permit easy visitations and also provide the capability of changing the use of property previously used as a repository since the total contents of the repository could be easily moved to other quarters. Since the cremated remains of the deceased are inert, any rupture of the tube structure of the repository which might also break open the individual containers would not present any health hazard to the community.

What is claimed is:

1. An urn and storage construction for interment of cremated remains comprising, in combination: a plurality of storage tube members arrayed and supported in a close generally parallel side-by-side and top-to-bottom relationship to one another; and a plurality of individual hollow urn contains having closed opposite ends and having at least a portion of their exterior surfaces defining a shape complementary to the inside cross section of said storage tubes slidably received within each of said tubes, thereby permitting the axial insertion into and removal of said containers from said tubes, said containers having a small axial dimension relative to that of said tubes.

2. The storage construction of claim 1 wherein: said tubes define a circular interior cross section.

3. The storage construction of claim 1 wherein: said tubes define in combination a honeycomb-shaped array in cross section.

4. A structure for interment of cremated remains comprising: a plurality of banks of tubular storage chambers; said chambers being arrayed and supported in a close side-by-side and top-to-bottom relationship to one another; a plurality of enclosed, hollow containers adapted to hold cremated remains and having an external configuration permitting axial loading of said containers within said chambers for storage thereof and being slidably received within each of said chambers; said containers having a small axial dimension relative to that of said chambers; said chambers including access ends through which said containers may pass and closed ends positioned at the opposite end of said chambers along the axis thereof; one of said banks being positioned relative to a second of said banks with said closed ends of said chambers of said one bank adjacent said closed ends of said chambers of said second bank.

5. The structure of claim 4 wherein: said access ends of said chambers of said first bank being exposed to the outside of said structure.

6. The structure of claim 4 wherein: a third of said banks being positioned relative to said second bank with said access ends of said chambers of said second and third banks defining an interior hallway therebetween.

References Cited

UNITED STATES PATENTS

| | | | |
|---|---|---|---|
| 751,466 | 2/1904 | Colling | 211—126 X |
| 1,142,941 | 6/1915 | Deal. | |
| 1,218,814 | 3/1917 | Steinmetz. | |
| 2,009,724 | 7/1935 | Bircher | 27—1 |
| 2,871,080 | 1/1959 | Shelly | 312—107 |
| 2,969,269 | 1/1961 | Shelly | 312—107 |
| 3,254,773 | 6/1966 | Diem | 211—71 |

FOREIGN PATENTS 639,739 11/1936 Germany.

RAMON S. BRITTS, Primary Examiner

U.S. Cl. X.R.

27—1; 211—84, 126; 312—107